United States Patent Office 3,109,093
Patented Oct. 29, 1963

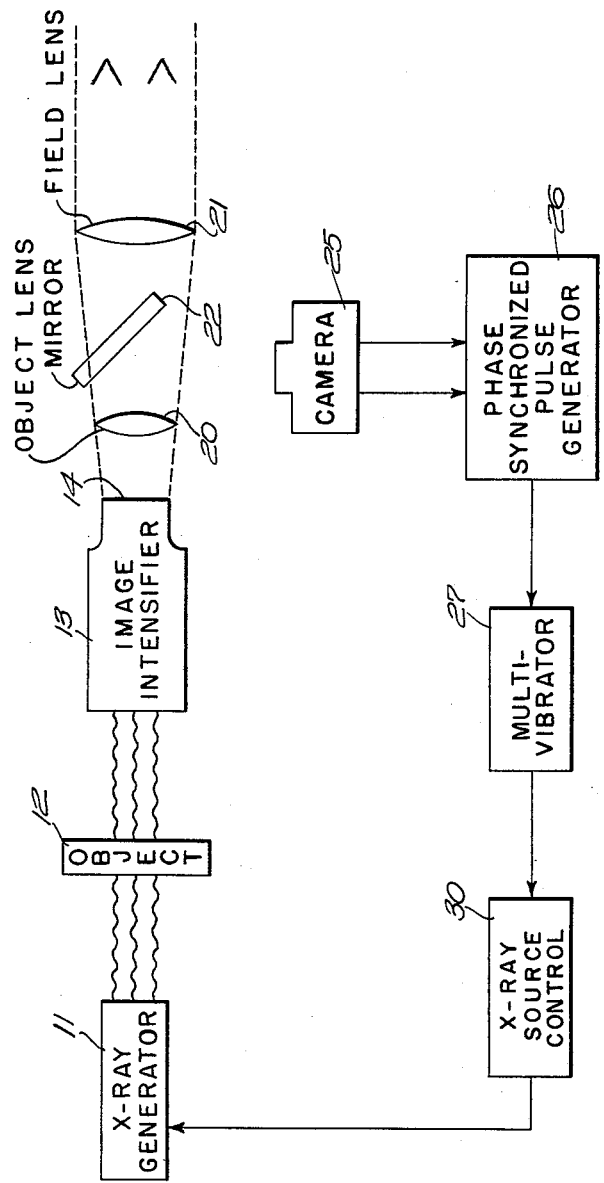

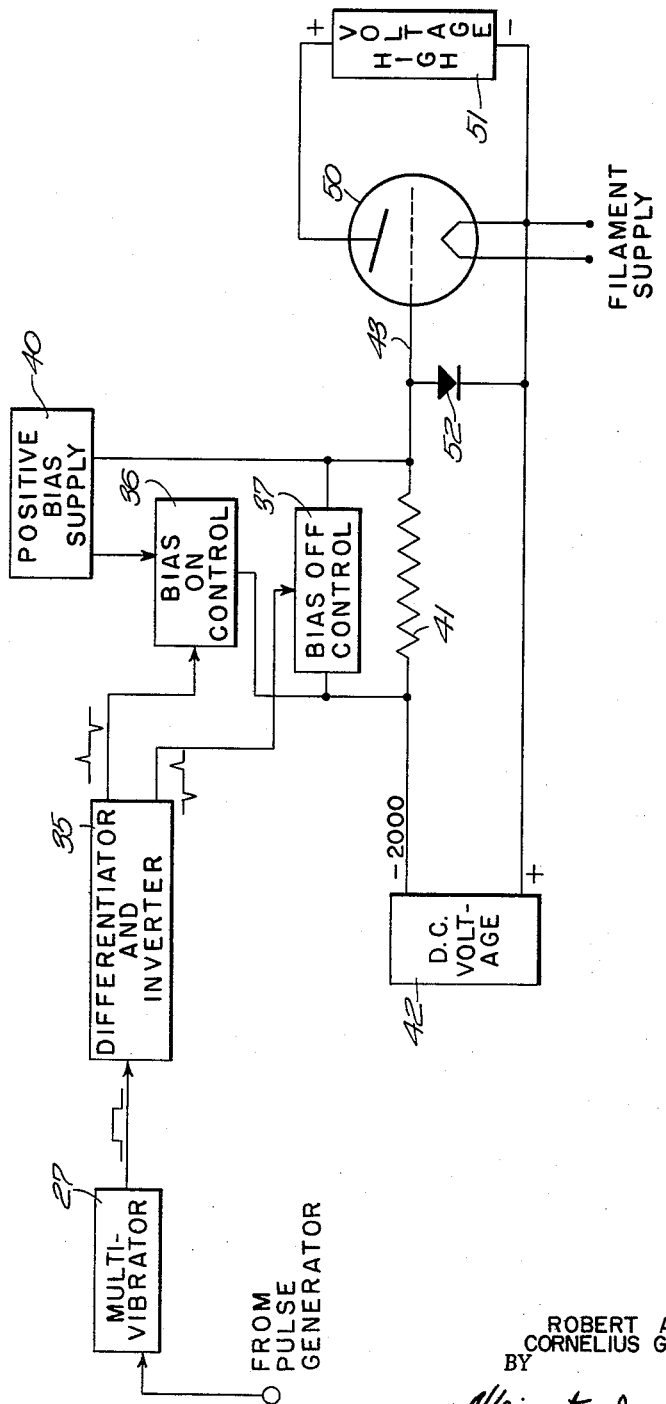

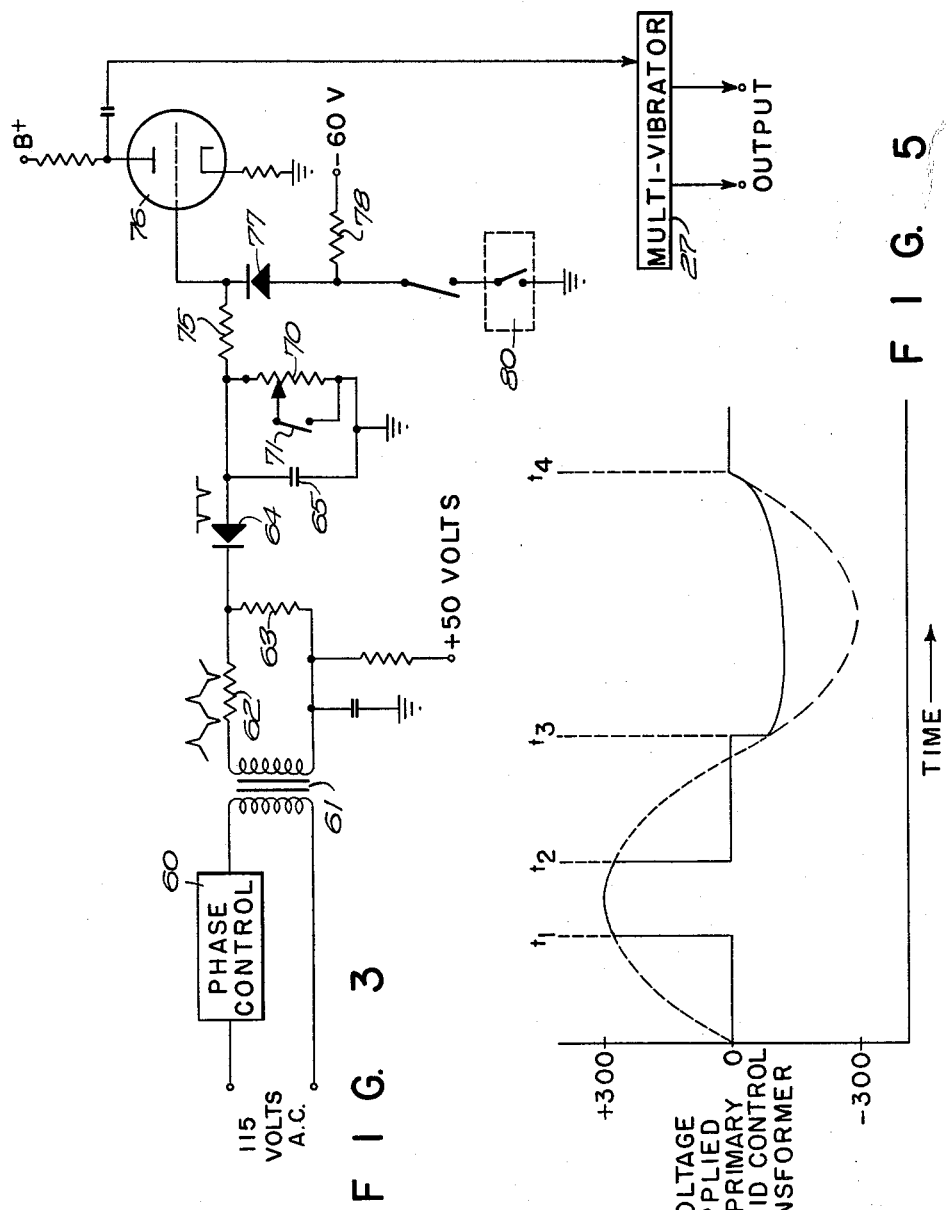

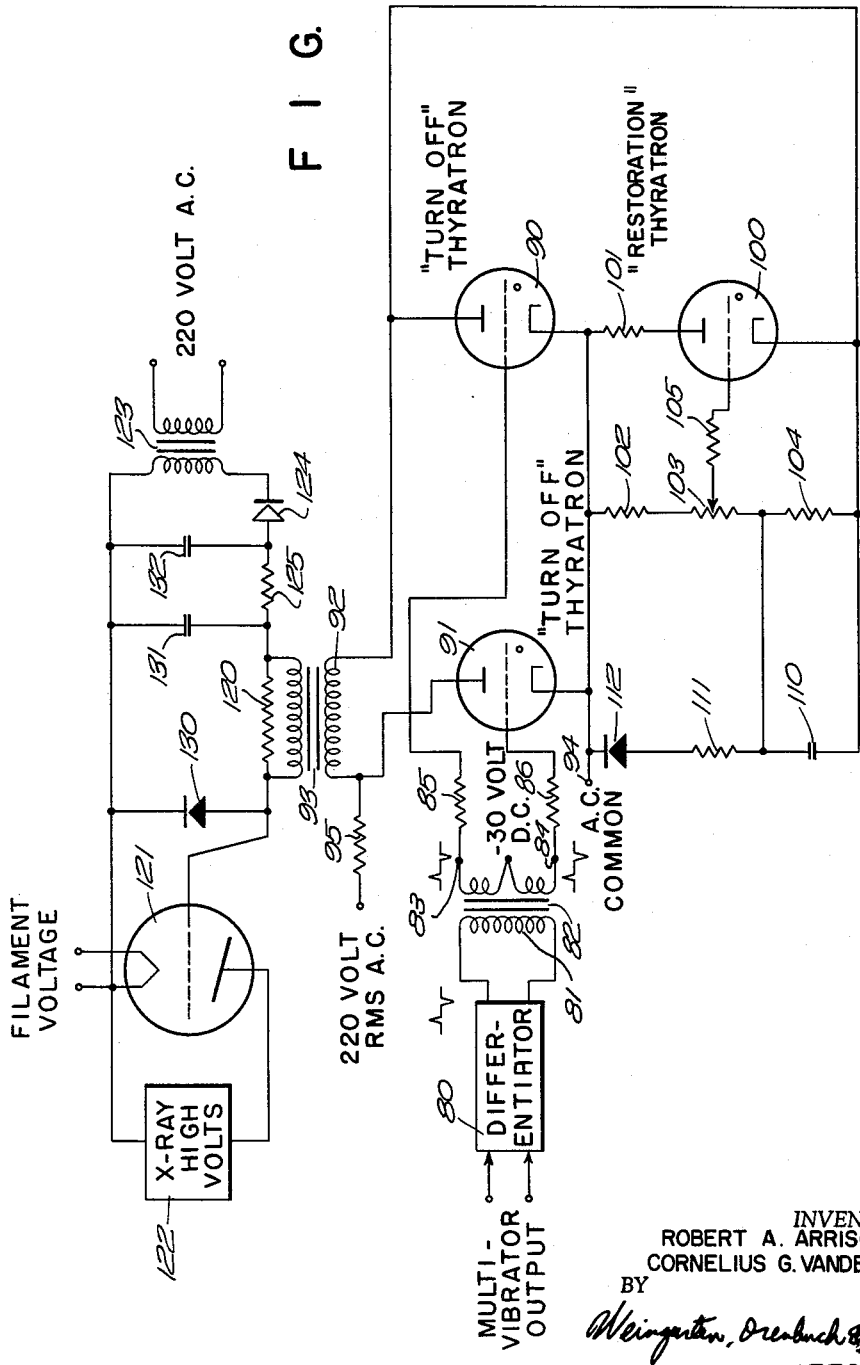

3,109,093
APPARATUS FOR COORDINATING CAMERA SHUTTER MOVEMENT WITH A PULSED X-RAY BEAM
Robert A. Arrison, Jr., Wellesley, and Cornelius G. Van der Velden, Framingham, Mass., assignors, by mesne assignments, to Laboratory For Electronics, Inc., Boston, Mass., a corporation of Delaware
Filed Jan. 31, 1961, Ser. No. 86,170
9 Claims. (Cl. 250—65)

This invention relates in general to a diagnostic X-ray system and more particularly to a system for controlling X-ray generator operation in conjunction with fluoroscopic or motion picture equipment.

Modern diagnostic X-ray systems generally include equiment for producing a visual image which can be utilized for direct viewing, cinematic or spot photography and television viewing. Such systems may include as an intermediate unit an image intensifier element which produces brighter images for direct viewing, as well as providing a means for making motion pictures at high frame rates and short exposure times while maintaining reasonable patient dosages.

One of the factors which must be given prime consideration in any diagnostic X-ray procedure is the Roentgen dosage received by the patient. Thus, it is mandatory to provide in systems, designed for the use of techniques such as high speed motion pictures, means to eliminate, within limits of practicality, all patient dosage which does not result in diagnostic information.

Another factor which must be considered specifically in motion pictures is the fact that the need to take repetitive pictures results from the motion of the subject and if the subject is in motion it is desirable to reduce the exposure time of each frame to stop motion just as the stroboscopic light is used in normal photography of fast moving objects.

One method of operating a moving picture camera in conjunction with an X-ray apparatus is to have the X-ray exposure continuing while the camera is running. However, a portion of the dose received by the patient in such instance is unnecessary, in that it occurs while the shutter of the camera is closed thereby contributing no information to the pictures.

Systems have been devised which provide that the X-ray generator is producing X-rays only when the shutter is open and these systems somewhat alleviate the above problem. In such systems the number of X-ray pulses generally correspond to the cycles of the alternating current on the primary of the X-ray transformer, and for a given exposure this number is linearly related to the duration of shutter opening. Since the shutters on the electrically operated movie cameras are also synchronized to the alternating current frequency, the frame repetition rate is invariably in terms of sub multiples of 60 cycles, such as 30 cycles, 15, 7½, etc. Thus, at a frame repetition rate of 15 frames per second, the exposure would include four X-ray pulses. Since the voltage on the primary of the transformer has a sinusoidal wave form, the X-ray energy distribution will also be sinusoidal and a significant portion of the X-rays generated in each pulse will be of substantially lower energy than the peak energy. These lower energy X-rays provide a high skin dosage to the patient being examined but do not contribute significantly to the produced X-ray image. Hence, the dosage created exceeds that which is necessary in order to produce a significantly bright and clear image and the exposure time per frame is much longer than that necessary to stop the motion of many anatomical parts.

Systems have also been designed utilizing switching means in the primary side of the high voltage X-ray transformer to provide one pulse per frame. With this technique of primary switching, the waveform of X-ray is essentially sinusoidal, hence much unnecessary low energy X-ray is generated which is absorbed entirely by the patient and never contributes to the image. Also, the effective exposure time, assuming a refinement which allows half waving, can be 6 to 8 milliseconds on thin subjects. During this period of time, a particle of blood may move several millimeters and many anatomical parts will be unnecessarily blurred.

Secondary switching circuits utilizing grid controlled rectifier valves and grid controlled tubes in series with the X-ray tube have also been devised. However, at the X-ray tube current levels used when working with an image intensifier system, the high voltage cable capacitance is so great that the intended waveforms are completely distorted resulting once again in longer than intended exposure times and the generation of low-energy X-ray photons during the charging and discharging of the cable capacitance. While this problem might be alleviated by using extremely short cables, the physical requirements in X-ray examination rooms invariably necessitate the use of 30 to 50 ft. cables to the X-ray tube and there is seldom convenient room for the addition of switching boxes adjacent to the X-ray tube.

It is therefore a primary object of the present invention to provide an X-ray diagnostic system producing high intensity images with X-rays having substantially the same quality as constant potential equipment and producing one X-ray pulse of relatively short duration for each opening of the camera.

It is another object of the present invention to provide an X-ray diagnostic system in which X-ray exposure is synchronized with camera shutter opening.

It is still another object of the present invention to provide an X-ray diagnostic system readily adaptable for either fluoroscopic or cinematic X-ray techniques.

Another object of the present invention is to provide an X-ray diagnostic system characterized by producing high intensity images with short time exposures for all camera speeds.

Broadly speaking, the X-ray system of this invention controls the X-ray exposure by means of triggering a grid control system in synchronism with each shutter opening in a movie camera. The pulse applied to the grid of the X-ray tube is essentially a constant duration square wave occuring in the middle of the alternating current half cycle, so that only the peak voltages are applied to the X-ray tube and hence the energy spectrum of the generated X-rays is considerably narrowed around the peak energy  The duration of this square wave may be any one of several preselected values, but typically would lie in the range of 0.5 to 4 milliseconds. Thus, a substantially constant potential X-ray pulse of short duration is developed. This pulse is synchronized to occur only once for each shutter opening, thereby providing a minimum dosage, high intensity, very short duration exposure for cinematic purposes. Since this exposure remains the same at all frame speeds of the camera, no variation in high voltage or beam current is required for different camera speeds. Again, since the duration is relatively short, high time resolution pictures are obtained even at low camera speeds. While in one preferred embodiment the duration of this pulse is constant, as mentioned above, the duration may also be a controlled variable. Thus, this pulse width may be controlled to maintain a constant brightness, or may be varied for different camera speeds in conjunction with current to produce a constant brightness. In either case the pulse would be synchronized with the A.C. power source to occur centered on the voltage maximum. Using grid control for pulsing the X-ray generator tube allows the switching to be maintained at a very low level, typically 40 watts at all exposures. Thus, if the exposure is to be at a peak voltage of 125 kilovolts at a peak current of 55 milliamps, the switching power is still 40 watts.

Other objects and advantages will become apparent from the following detailed description when taken in conjunction with the accompanying drawing in which:

FIG. 1 is an illustration in block diagrammatic form of a preferred embodiment of the apparatus of this invention;

FIG. 2 is an illustration partially in schematic and partially in block diagrammatic form of a portion of an X-ray apparatus in accordance with the principles of this invention;

FIG. 3 is an illustration partially in block diagrammatic and partially in schematic form of the camera trigger system of an apparatus in accordance with the principles of this invention;

FIG. 4 is an illustration in schematic form of the grid control system of an apparatus in accordance with the principles of this invention; and FIG. 5 is a graphical illustration of the voltage applied to the primary of the grid control transformer as a function of time.

With reference now specifically to FIG. 1 an X-ray diagnostic system in accordance with this invention is illustrated. An X-ray generator 11 produces X-rays which impinge upon the object 12 thus casting a shadow image on the input to the image intensifier 13. The output image of the image intensifier 13 appearing on output 14 is optically coupled through an object lens 20 and a field lens 21 to the viewer. A partially transmissive mirror 22 is interposed between the object lens 20 and the field lens 21 and this transmits the image to the viewer and at the same time reflects the image into the input of movie camera 25. The camera 25 is electrically coupled to a phase synchronized pulse generator 26, which in turn provides a triggering pulse to multivibrator 27. The output of multivibrator 27 is provided to X-ray source control 30 which controls the operation of the X-ray generator 11 and hence the emission of X-rays from it. The coupling between the camera element 25 and the phase synchronized generator 26 will be explained in circuit detail below, however, the coupling enables the pulse generator 26 to provide a single output pulse in response to each shutter opening of the camera 25. The generator 26 is arranged so that each of these pulses bears a particular phase relationship to the primary alternating current source providing power to the circuits, the X-ray generator and the camera. This pulse from pulse generator 26 acts as a triggering pulse for multivibrator 27. The multivibrator 27 provides a fixed duration square wave output pulse, however the duration of this output pulse may be preset at any one of a number of time values. This square wave pulse acts through the X-ray source control 30 to impose a square wave on the grid of the X-ray generator tube 11, thus providing for each shutter opening a fixed duration pulse of X-rays bearing a predetermined relationship to the phase of the primary alternating current source. The exact relation of the X-ray pulse to the alternating current phase and the detailed operation of the circuitry will be described below.

With reference now to FIG. 2, the circuit functions from the multivibrator to the X-ray genertaor will be described in order to facilitate understanding of the detailed circuits illustrated in FIGS. 4 and 5. The pulse from the pulse generator 26 triggers multivibrator 27. Multivibrator 27 is a conventional multivibrator providing, in response to each triggering pulse, a single positive square wave output pulse of fixed duration. The duration of this output pulse may be preselected and would typically lie within the range of 0.5 to 4 milliseconds. The square wave output from the multivibrator is then applied to a differentiating and inverting unit 35 providing two outputs. The differentiator and inverter differentiates the square wave input with a relatively short time constant and provides on one output the non-inverted differentiated pulse and on a second output the same pulse inverted. The first output is provided to the "bias on" control unit 36, which acts in response to the positive portion of the differentiated pulse to apply a positive voltage from bias supply 40 across resistor 41. The positive portion of the differentiated pulse on the second output, which now lags the positive portion on the first output by the width of the multivibrator pulse, is applied to "bias off" control unit 37 which removes the positive voltage bias from resistor 41. The overall effect then is that a positive bias voltage is applied to resistor 41 for a time equal to the duration of the multivibrator 27 output pulse. Resistor 41 has one end coupled to the negative terminal of the D.C. voltage supply 42 and the other coupled to the control grid 43 of the X-ray generator tube 50. The D.C. voltage supply 42 provides an output voltage of approximately 2000 volts and has its positive terminal coupled directly to the cathode of the X-ray generator tube 50. The X-ray generator tube 50 has high voltage applied between the anode and cathode from high voltage supply 51. A diode 52 coupled between the grid and cathode of the X-ray generator prevents the grid of the X-ray generator tube from going to any substantial positive value. The overall action of this circuit is that, under conditions where there is no pulse applied to multivibrator 27, the D.C. supply 42 provides to the grid of the X-ray tube a bias voltage of, typically, 2000 volts negative with respect to the filament, thus rendering this X-ray generator tube 50 nonconducting. In response to a pulse on the pulse generator, the multivibrator 27 and differentiator 25 units provide a positive voltage across resistor 41 for the duration of the multivibrator pulse. The positive bias voltage supply 40 provides an output in excess of 2000 volts, and the negative bias is removed from the grid of the X-ray generator 50. For the duration of this positive bias, the generator tube is conducting providing an X-ray output. Thus, the output pulse of X-rays from the X-ray generator is provided for a specific amount of time equal to the duration of the multivibrator pulse and coincident with the occurrence of this pulse.

Referring now to FIGS. 3 and 4 a circuit embodying the principles of this invention is illustrated in schematic form with that portion of the circuit up to and including the multivibrator being shown in FIG. 3 and the remainder shown in FIG. 4. A 115 volt R.M.S. alternating current potential is applied through a phase control unit 60 across a peaking transformer 61 generating across the secondary winding of the transformer 61 a peak wave form (as shown), the phase of which may be controlled with respect to the 115 volt alternating current source. This source is in turn directly related to the overall alternating current power source. A positive 50 volt bias is applied through resistor 61 to one end of the secondary winding of the peaking transformer 61 thereby displacing this waveform positively with respect to ground by 50 volts. The resistors 62 and 63 provide a load for transformer 61 and thereby prevent undesired oscillations. Diode 64 has its cathode connected through resistor 62 to one end of the secondary winding of transformer 61 while the anode of diode 64 is connected to one side of capacitor 65, the other end of which is connected directly to ground. The overall effect, then, is that only the negative portion greater than −50 volts is passed by a diode 64 and applied across capacitor 65. Resistor 70 is coupled between ground and the anode of diode 64 directly across capacitor 65 and serves as a discharge resistor for this capacitor; the values of the capacitor 65 and resistor 70 being chosen to provide a time constant in the order of .02 second. A single pole, single throw switch 71 is coupled through a tap across a portion of resistor 70 and for operation with the movie camera this switch is kept in the open position. For fluoroscopic use of the circuitry the switch may be closed to provide a rapid fall time for the pulses. The anode of the diode 64 is also coupled serially through resistor 75 to the grid of amplifier tube 76. Also coupled to the grid of amplifier 76 is the cathode of diode 77, the anode of which is connected through resistor 78 to a −60 volt D.C. supply. This anode is also coupled through normally closed switch 79 to one contact of the movie camera commutator 80. The other contact of camera commutator 80 is connected directly to ground. The operation of the camera commutator provides that the commutator is in the open position as shown whenever the shutter is open and in the closed position whenever the shutter is closed. The switch 79 is normally in the closed position as indicated, but is thrown to the open position for operation of the circuit without the movie camera. An output is taken from the plate of the amplifier 76 and applied to the input of multivibrator 27.

Considering now the operation of the above circuit, the peaking transformer provides continuously a series of pulses, of the waveform as shown in FIG. 3, at the alternating current frequency, in this instance 60 cycles per second. Only the negative portions of this waveform are passed through rectifying diode 64, which is also biased off 50 volts. Hence, negative pulses of approximate amplitude of 50 volts appear on the anode of diode 64. Each of these pulses charges up capacitor 65 and this charge subsequently leaks off with a time constant depending upon the condition of diode 77. Thus if diode 77 is in the highly non-conducting condition, the time constant is determined by resistor 76 and the charge will decay with a time constant of approximately .02 second. Under these conditions only about 30% of the voltage across capacitor 65 will have decayed before another pulse arrives to recharge it. On the other hand when diode 77 is strongly conducting, the time constant is determined by the value of resistor 75 which typically might be 100K and hence the voltage across capacitor 65 from one pulse would have substantially decayed back to 0 before the next pulse at a 60 cycle frequency arrives. The condition of diode 77 is controlled by the operation of the camera commutator since the opening and closing of the commutator switch controls the bias applied to the anode of the diode. Thus when the commutator switch is open, the −60 volt bias appears on the anode and renders this diode 77 highly non-conducting, while when the camera commutator switch is closed, the 60 volt bias is applied directly across resistor 78 to ground and hence the bias is effectively removed from the anode of diode 77. The operation then is that when the commutator switch is open, corresponding to the shutter of the camera being opened, the diode is in the highly non-conducting state with a result that the controlling time constant on the capacitor 65 leak rate is .02 second and that the voltage drop across capacitor 65 appears across the high back impedance of the diode and on the grid of the amplifier tube 76. Consequently, a positive pulse is produced on the anode output of amplifier 76 and this pulse serves as a trigger for multivibrator unit 27. On the other hand, when the commutator is in the closed position corresponding to the shutter being closed, the diode 77 represents a very small impedance and hence no significant voltage is developed at the control grid of amplifier 76 and no triggering pulse is provided to multivibrator 27.

As previously indicated, one of the functions of the circuit shown in FIG. 3 is to provide, that for each shutter opening, only a single triggering pulse is provided to multivibrator 27 independently of the repetition rate of the shutter opening. Considering the operation of this circuit when the repetition rate of the camera is 7 cycles per second, it is apparent that the commutator switch will be open for approximately .07 second. Up until the time the commutator switch is open, the diode is rendered highly conducting and hence no pulses appear on the control grid. However, when the commutator switch opens, the next pulse to pass through diode 64 appears on the grid of amplifier 76 and hence triggers multivibrator unit 27. As this pulse starts to decay across capacitor 65, a second pulse comes in after approximately .16 second and the second pulse again drops the voltage to full negative amplitude. However, as indicated previously, each of these pulses is approximately 50 volts, whereas the amplifier tube 76 is operated in a condition such that it is cut off by a negative pulse of approximately 10 volts. Hence, the second pulse which appears as a negative drop from approximately −35 volts to −50 volts does not appear on the output of amplifier 76 since the entire change takes place while the amplifier is in the cut off conditon. The second pulse again starts to decay and it has decayed by approximately 30 in one time constant, at which point the next 60 cycle generated pulse appears on the anode of diode 64 again returning the voltage across capacitor 65 to the maximum negative potential. This process is repeated until the camera commutator switch closes, at which point the highly conducting state of diode 77 renders the impedance of resistor 75 the controlling time constant of about .002 second. Where the repetition rate is higher, for example 60 cycles per second, then the commutator switch will be open for approximately 1/60 of a second each time. In this instance, the action is as before, except that the voltage across capacitor 65 from the first pulse is returned to 0 by the action of the closing of the commutator 80 before the second pulse appears on the anode of diode 64. Consequently each pulse will provide an output from amplifier 76 and the multivibrator will be triggered 60 times per second. Phase control unit 60 is adjustable and hence can be utilized to control the time relation of the leading edge of the pulse appearing on the control grid of amplifier 76 with relation to the phase of the primary A.C. voltage and hence the leading edge of the multivibrator output pulse can be related exactly in time to the peak of the primary A.C. voltage. The appropriate phase relations between this multivibrator pulse and the primary A.C. will be discussed below in connection with the operation of the grid control X-ray tube itself.

With reference now to FIG. 4 the circuit detail after the multi-vibrator unit 27 is shown. The output of the multivibrator is applied to differentiator 80 which differentiates the squarewave output from the multivibrator and provides the differentiated pulse on its output. The waveform of the output of the differentiator is, as indicated, a positive pip followed by a negative pip. This output is provided across the primary winding 81 of transformer 82 which has a center tap secondary winding. Between the center tap and one end, then, the differentiated pulse appears in phase with the pulse across the primary winding 81 of the transformer, while between the other end and the center tap the differentiated pulse appears 180 out of phase with respect to the pulse on the primary winding. The end terminal 83 of the secondary winding of transformer 82 is coupled through resistor 85 to the control grid of the thyratron 90, while terminal 84 of the same winding is coupled through resistor 86 to the control grid of thyratron 91. As indicated by the waveforms in FIG. 4, the positive pip on terminal 84 lags in time behind the positive pip on terminal 83 by a time which is equal to the duration of the multivibrator square wave. Thyratron 90, labeled "turn on thyratron," has its anode coupled to one end of the primary winding 92 of transformer 93 and its cathode connected directly to the A.C. common lead 94. Thyratron 91, labeled "turn off thyratron," has its anode coupled directly to the other side of primary winding 92 and its cathode is also coupled to A.C. common lead 94. In addition the anode of thyratron 91 is connected through resistor 95 to a 220 volt R.M.S. A.C. supply. A third thyratron 100 (labeled "restoration" thyratron) has its cathode connected directly to the anode of thyratron 90 while its anode is connected through resistor 101 to the A.C. common terminal 94. Between the A.C. common lead 94 and the cathode of thyratron 100 are serially connected resistors 102, 103 and 104 with resistor 103 having a variable center tap which is connected through resistor 105 to the control grid of thyratron 100. Also connected between the cathode of thyratron 100 and the A.C. common is a serial combination of capacitor 110 resistor 111 and diode 112 with the cathode of diode 112 being connected directly to the A.C. common terminal 94. A resistor 120, which typically would have a value of 100K is connected across the secondary winding of transformer 93. Transformer 93, in this case, has a turns ratio of about 50 to 1, hence the reflected impedance across the primary is about 2000 ohms.

Having described the circuit configuration above, its operation will now be discussed. The above described portion of this circuit indicated in FIG. 4 has the function of providing across resistor 120 a 2,000 volt positive pulse corresponding in time of occurrence and duration to the multivibrator output pulse. When there is no multivibrator output pulse present, the 220 volt A.C. terminal is coupled through resistor 95, the primary winding 92 of transformer 93, and resistor network 102, 103 and 104 to the A.C. common terminal. Typically the impedances of this return path would be as follows:

|  | Ohms |
|---|---|
| Resistor 95 | 25 |
| Impedance across primary winding 92 | 2,000 |
| Resistor 102 | 470,000 |
| Resistor 103 | 500,000 |
| Resistor 104 | 39,000 |
| Resistor 111 | 18,000 |

In this condition, with none of the thyratrons fired, the voltage drop across the primary winding 92 is insignificant. Turning now to the situation when the multivibrator does provide an output pulse, the positive pip appearing on terminal 83 is arranged to be in phase with the positive maximum voltage of the A.C. supply. Since this A.C. supply provides the anode voltage for thyratron 90, the simultaneous appearance of the positive pulse on the control grid and the positive anode voltage fires thyratron 90, thus producing a low impedance path to ground through the primary winding 92 and resistor 95 from the 220 volt supply. This has the effect of producing a voltage drop across the primary winding 92 of about 290 volts, and hence inducing a voltage across resistor 120 of approximately +2000 volts.

The trailing edge of the multivibrator pulse is represented by the positive pip appearing on terminal 84 and since it lags the previous pip by only 2 to 4 milliseconds, it occurs while the anode of thyratron 91 is still near the positive peak voltage from the 220 volt A.C. supply and hence fires thyratron 91. The firing of thyratron 91 provides a direct low impedance path from the 220 volt R.M.S. terminal through resistor 95 to the A.C. common, with the voltage drop across thyratron 91 being in the order of 10 volts. The voltage drop across the primary winding 92 and hence across resistor 120 is reduced to substantially zero and insufficient current is supplied to the anode of thyratron 90 to sustain its discharge at its reduced voltage. This thyratron then returns to its non-conducting state. Thyratron 91 is extinguished when the anode voltage following the 60 cycle waveform is reduced below that potential necessary to sustain the discharge (typically about 10 volts).

Thyratron 100, referred to as the "restoration" thyratron, and its associated circuitry serve the purpose of driving current through the transformer 92 in the reverse direction in order to prevent the core from being saturated. This thyratron is fired on the negative half cycle of the A.C. voltage supply and need only be fired when the other two thyratrons have been fired on the previous positive half cycle. Referring now to FIG. 5 the waveform of the voltage across the primary winding of the grid control transformer 93 as a function of time is shown in the solid line with the relationship to the 60 cycle supply voltage indicated by the dotted line waveform. Time $t1$ is the time at which the thyratron 90 turns on and time $t2$ is the time at which the thyratron 91 fires reducing the voltage across the primary winding. The "restoration" thyratron 100 then fires at time $t3$ on the negative half cycle and is extinguished when the voltage falls below that necessary to sustain the discharge at the time $t4$. Considering first the operation of thyratron 100 when the thyratrons 90 and 91 have not fired, it will be seen that on the positive half cycle of the A.C. supply capacitor 110 is charged through resistor 111 and diode 112. The capacitor 110 would typically have a value of .1 microfarad, hence the time constant for leakage of this voltage from the capacitor through resistor 104 during the negative half cycle of alternating current when diode 112 is non-conducting is approximately 20 milliseconds.

The proportion of the alternating current amplitude which is provided to the grid of thyratron 100 is controlled by the position of the adjustable center tap on resistor 103. The operation of the circuit, then, is that the negative bias on the cathode of thyratron 100 as a result of the voltage across capacitor 110 prevents the thyratron from discharging in response to the negative half cycle of the alternating current applied to the grid of this thyratron. However, when thyratrons 90 and 91 are fired, the voltage drop (as indicated in FIG. 5) across the primary winding 92 of transformer 93 results in a waveform at the cathode terminal of thyratron 100 in which substantially all of the positive aspect of the applied A.C. voltage has been removed. Consequently capacitor 110 is not charged and the negative bias is not provided to the cathode of thyratron 100. Under these circumstances the following negative half cycle fires this thyratron thus drawing current in the reverse direction from that drawn by the action of thyratrons 90 and 91, through primary winding 92 and preventing saturation of the core of transformer 93.

Turning now to the remainder of the circuit as illustrated in FIG. 4, the X-ray tube 121 is a conventional grid controlled X-ray tube supplied by X-ray high voltage supply 122. The high voltage supply 122 provides a rectified A.C. voltage across the anode and cathode connections of the X-ray generator tube 121. Under load conditions this high voltage is not, however, a pure D.C. component but rather the alternating current ripple is such that the anode voltage varies substantially in accordance with the waveform of the primary alternating current power. The action of the control grid tube is such that the X-ray generator is fired, thereby producing X-rays, only when the control grid is not biased negatively. A transformer 123, with a turns ratio of approximately 7 to 1, has its primary winding coupled across the 220 volt R.M.S. A.C. line. The secondary winding of this transformer 123 is connected at one end directly to the cathode of X-ray generator tube 121 while the other end is connected to the cathode of a diode 124, the anode of which is coupled through resistor 125 to one end of resistor 120. The other end of resistor 120 is coupled directly to the grid of the X-ray generator 121. A diode element 130 is coupled between the grid and cathode of the X-ray generator tube 121 and is oriented to pass positive current from the grid to the cathode. A pair of capacitors 131 and 132 are connected from either side of resistor 125 to the cathode of X-ray generator tube 121. The action of transformer 123, coupled with this circuit involving diode 124, the capacitors 131 and 132 and resistor 125, is such as to provide a bias D.C. voltage of −2000 volts at the junction between resistor 120 and resistor 125. When the positive 2000 volt pulse is generated across resistor 120 in response to the multivibrator pulse, the −2000 volts, which served as a negative bias on the control grid of the X-ray tube 121, is bucked out, and the X-ray tube fires generating X-rays for the duration of the +2000 volt pulse.

In the discussion above, the phase relation has been referred to at various points. The timing of the square wave pulse across resistor 120 should be related to the phase of the A.C. power supplying the anode voltage to the X-ray tube 121 such that this pulse occurs at the peak voltage, thereby providing maximum X-ray energy with minimum distribution of energy. This phase relation is controlled by the phase control unit 60 in series with the primary winding of peaking transformer 61. The operation of this unit controls the firing time of the multivibrator and accordingly the time when the pulse is generated across resistor 120.

While the invention has been described above in terms of a specific circuit embodiment, it is not so limited. In view of the fact that numerous departures and modifications may now be made by those skilled in the art, the invention described herein should be limited only by the spirit and scope of the appended claims.

What is claimed is:

1. Apparatus controlling the emission of X-rays from a grid controlled X-ray tube onto an object to form an X-ray image comprising, means for converting said X-ray image into a visual image; camera means adapted to view said visual image, said camera means having a repetitively operated shutter; pulse generating means adapted to provide one fixed duration square wave output pulse in response to each opening of said shutter; the duration of said pulse being independent of the repetition rate at which said shutter is operated; means adapted to pulse the grid of said X-ray tube for the duration of each of said output pulses thereby generating a pulse of X-rays for the duration of each of said output pulses.

2. Apparatus for controlling the emission of X-rays from a grid controlled X-ray tube onto an object to form an X-ray image comprising, means for converting said X-ray image into a visual image; camera means adapted to view said visual image, said camera means having a repetitively operated shutter; pulse generating means adapted to provide one fixed duration square wave output pulse in response to each opening of said shutter; the duration of said pulse being independent of the repetition rate at which said shutter is operated; a high voltage source supplying power to said X-ray tube, said high voltage source having a substantial alternating current component; means adapted to pulse the grid of said X-ray tube for substantially the duration of each of said output pulses; means for relating the time of occurrence of each of said output pulses to the phase of said alternating current high voltage component such that each of said output pulses is generated when said alternating current component is near its positive maximum.

3. Apparatus in accordance with claim 2 wherein the duration of each of said output pulses is no more than one-quarter of the duration of one cycle of said alternating current high voltage component, and wherein the output pulse is related in time to said alternating current voltage component such that the leading and trailing edges of said square wave are equally separated in time from the positive maximum of said alternating current component.

4. Apparatus in accordance with claim 1 wherein said pulse generating means comprises, a source of alternating current voltage; a peaking network coupled across said alternating current source and adapted to provide on its output pulses corresponding to the maximum positive and negative voltages for each cycle of said alternating current voltage; rectifying means coupled to the output of said peaking network and adapted to pass pulses of only one polarity; gating means coupled to the output of said rectifying means and adapted to pass pulses only when said shutter is open; multivibrator means coupled to said gating means and adapted to provide an output pulse of fixed duration in response to pulses from said gating means.

5. Apparatus controlling the emission of X-rays from a grid controlled X-ray tube onto an object to form an X-ray image comprising, means for converting said X-ray image into a visual image; camera means adapted to view said visual image, said camera means having a repetitively operated shutter; pulse generating means adapted to provide one fixed duration output pulse in response to each opening of said shutter; means adapted to pulse the grid of said X-ray tube for the duration of each of said output pulses thereby generating a pulse of X-rays for the duration of each of said output pulses, wherein said means adapted to pulse the grid of said X-ray tube comprises differentiator means coupled to the output of said pulse generator and adapted to provide as an output the differentiated waveform of said output pulse; a source of direct current voltage; a resistor coupling the grid of said X-ray tube to the negative terminal of said direct current voltage source; means responsive to said differentiated waveform for generating a positive voltage across said resistor for the duration of said output pulse, said positive voltage generated across said resistor being sufficient to equalize said voltage from said D.C. voltage source, and further wherein said means for generating a positive voltage across said resistor comprises, a transformer having its secondary winding connected across said resistor, a source of alternating current voltage having first and second terminals; one end of the primary winding of said transformer being connected to said first alternating current voltage terminal; first and second thyratrons, each of said thyratrons having an anode, control grid and cathode; the other end of said transformer primary winding being connected directly to said anode of said first thyratron element, said cathode of said first thyratron element being connected directly to said second alternating current voltage terminal; a resistive element exhibiting an impedance high in comparison to the impedance of said primary winding of said transformer, said resistive element being coupled between said anode and said cathode of said first thyratron element; said anode of said second thyratron element being coupled to said first alternating current voltage terminal, said cathode of said second thyratron element being coupled to said second alternating current voltage terminal; first coupling means coupling said output pulse to said control grid of said first thyratron element in a fashion such that said first thyratron fires in response to the leading edge of said output pulse; second coupling means coupling said output pulse to said control grid of said second thyratron in such a fashion that said second thyratron fires in response to the trailing edge of said output pulse.

6. Apparatus in accordance with claim 5 and including a third thydratron element having an anode, cathode and control grid, said cathode of said third thyratron element being connected directly to said first thyratron anode, said anode of said third thyratron element being resistively coupled to said second alternating current voltage terminal; means for applying continuously a preselected fraction of the voltage developed across said resistive element to said third thyratron control grid; said fraction being sufficent to fire said third thyratron, when said second alternating current terminal has a positive voltage with respect to said first alternating current terminal; means operative when said positive voltage is not generated across said resistor for generating a negative bias on said third thyratron control grid, said negative bias being sufficient to inhibit the firing of said third thyratron.

7. Apparatus controlling the emission of X-rays from a grid controlled X-ray tube onto an object to form an X-ray image comprising, means for converting said X-ray image into a visual image; camera means adapted to view said visual image, said camera means having a repetitively operated shutter; pulse generating means adapted to provide one fixed duration square wave output pulse in response to each opening of said shutter, said pulse generating means including a source of alternating current voltage; a peaking network coupled across said alternating current source and adapted to provide on its output pulses corresponding to the maximum positive and negative voltages for each cycle of said alternating current voltage; rectifying means, coupled to the output of said peaking network and adapted to pass pulses of only one polarity; gating means coupled to the output of said rectifying means and adapted to pass pulses only when said shutter is open; multivibrator means coupled to said gating means and adapted to provide an output pulse of fixed duration in response to pulses from said gating means; an amplifier coupling said gating means to said multivibrator; a capacitor coupled across the input of said amplifier; an impedance coupled across said capacitor, the value of said impedance being such that the time constant formed by said capacitor and said impedance is short when said gating means is closed and when said gating means is open said time constant is long compared to the spacing between said peaking transformer output pulses, said amplifier being biased such that a fraction of said peaking transformer output pulse applied to said amplifier will place said amplifier in the cutoff condition; and means adapted to pulse the grid of said X-ray tube for the duration of each of said output pulses thereby generating a pulse of X-rays for the duration of each of said output pulses.

8. Apparatus controlling the emission of X-rays from a grid controlled X-ray tube onto an object to form an X-ray image comprising, means for converting said X-ray image into a visual image; camera means adapted to view said visual image, said camera means having a repetitively operated shutter; pulse generating means adapted to provide a fixed duration square wave output pulse in response to each opening of said shutter; means adapted to pulse the grid of said X-ray tube for the duration of each of said output pulses thereby generating a pulse of X-rays for the duration of each of said output pulses, said means adapted to pulse the grid of said X-ray tube including, differentiator means coupled to the output of said pulse generator and adapted to provide as an output the differentiated waveform of said output pulse, a source of direct current voltage, a resistor coupling the grid of said X-ray tube to the negative terminal of said direct current voltage source, means responsive to said differentiated waveform for generating a positive voltage across said resistor for the duration of said output pulse, said positive voltage generated across said resistor being sufficient to equalize said voltage from said D.C. voltage source.

9. Apparatus in accordance with claim 8 wherein said means for generating a positive voltage across said resistor includes a bias voltage supply, means adapted to couple said bias voltage supply across said resistor in response to the leading edge of said differentiated waveform, means adapted to remove said bias voltage from said resistor in response to the trailing edge of said differentiated waveform.

References Cited in the file of this patent

UNITED STATES PATENTS

| | | |
|---|---|---|
| 2,584,007 | Fischer | Jan. 29, 1952 |
| 2,679,598 | Wright et al. | May 25, 1954 |
| 2,730,652 | Gutton et al. | Jan. 10, 1956 |
| 2,829,272 | Ball | Apr. 1, 1958 |
| 2,862,107 | Cummings | Nov. 25, 1958 |
| 2,937,277 | Euler et al. | May 17, 1960 |

FOREIGN PATENTS

| | | |
|---|---|---|
| 297,716 | Germany | May 8, 1917 |
| 563,706 | Canada | Sept. 23, 1958 |